United States Patent Office 2,963,478
Patented Dec. 6, 1960

2,963,478
4,7-DIAMINO-N-ARALKYL-2-ARYL-6-PTERIDINECARBOXAMIDES

Joseph Weinstock, Havertown, Pa., assignor to Smith Kline & French Laboratories, Philadelphia, Pa., a corporation of Pennsylvania No Drawing. Filed May 4, 1959, Ser. No. 810,552

8 Claims. (Cl. 260—251.5)

This invention relates to a novel series of 4,7-diamino-N-aralkyl-2-aryl-6-pteridinecarboxamides which have useful pharmacodynamic activity.

More specifically the compounds of this invention have diuretic and natriuretic activity with a low order of side effects.

The novel pteridinecarboxamide compounds of this invention are represented by the following structural formula:

FORMULA I

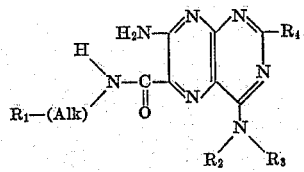

in which $R_1$ represents phenyl, phenyl monosubstituted by lower alkyl, lower alkoxy, halogen having an atomic weight of less than 80 or nitro, or an aromatic heterocycle having a 5 or 6-membered ring containing a single hetero member of the group of oxygen, sulfur or tertiary nitrogen such as furyl, thienyl or pyridyl; Alk represents an alkylene group having from 1 to 6 carbon atoms preferably 1 to 2 carbon atoms; $R_2$ and $R_3$ represent hydrogen or lower alkyl; $R_4$ represents phenyl,

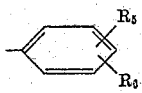

or thienyl; and $R_5$ and $R_6$ represent lower alkyl, lower alkoxy, halogen having an atomic weight of less than 80, nitro, hydroxy or amino.

Advantageous compounds of this invention are represented by the following structural formula:

FORMULA II

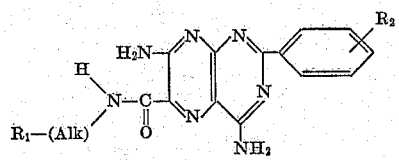

in which $R_1$ represents phenyl, phenyl monosubstituted by lower alkyl, lower alkoxy, halogen having an atomic weight of less than 80 or nitro, or an aromatic heterocycle having a 5 or 6-membered ring containing a single hetero member such as oxygen, sulfur or tertiary nitrogen; Alk represents methylene or ethylene and $R_2$ represents hydrogen, methyl, methoxy, halogen having an atomic weight of less than 80, nitro, hydroxy or amino.

The advantageous and preferred compounds of this invention are represented by the following formula:

FORMULA III

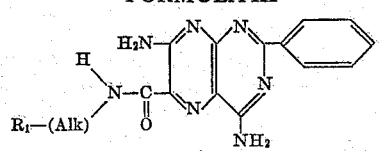

in which $R_1$ represents phenyl, p-chlorophenyl, p-methoxyphenyl or pyridyl and Alk represents methylene or ethylene.

A compound of particularly advantageous activity and therefore the preferred object of this invention is 4,7-diamino-N-benzyl-2-phenyl-6-pteridinecarboxamide.

By the terms "lower alkyl" and "lower alkoxy" where used herein aliphatic groups having a maximum of 4 carbon atoms and preferably not more than 2 carbon atoms are indicated.

The compounds of this invention are prepared according to the following synthetic procedure:

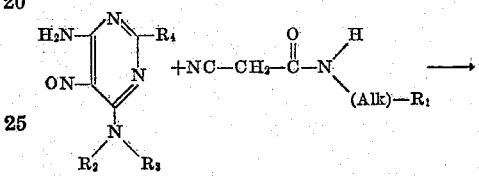

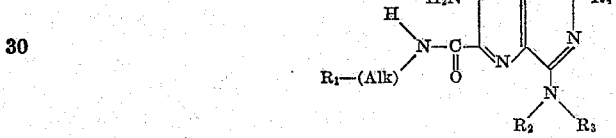

The terms Alk, $R_1$, $R_2$, $R_3$ and $R_4$ are as previously defined.

A 4,6-diamino-2-aryl-5-nitrosopyrimidine is reacted with an N-aralkyl-α-cyanoacetamide usually in excess, in a suitable organic solvent in which the reactants are substantially soluble such as a lower alcohol, for example, ethanol or isopropanol, ethoxyethanol or, advantageously, dimethylformamide. The reaction is preferably carried out in the presence of an alkali metal alkoxide such as potassium or sodium alkoxide, for example, sodium methoxide, potassium methoxide or sodium ethoxide, usually in excess. The reaction mixture is heated at temperatures of from about 50° C. to about 200° C., preferably at reflux temperature for about two to about thirty minutes. Longer reaction periods are of no particular advantage. Dilution of the reaction mixture with about half to an equal volume of water results in the precipitation of the compound of this invention which may be isolated by filtration and purified by recrystallization from a suitable solvent such as dimethylformamide or aqueous dimethylformamide.

The 4-unsubstituted amino-6-amino-2-aryl-5-nitrosopyrimidine intermediates are conveniently prepared by the reaction of an amidine hydrohalide such as hydrochloride or hydrobromide, with, preferably, a slight excess of the silver salt of isonitrosomalononitrile in a lower alcohol solvent, such as methanol or ethanol and the thermal cyclization of the resulting amidine salt in an organic solvent such as, for example 5-ethyl-2-methylpyridine, 2- or 3-picoline, pyridine or quinoline or mixtures of these solvents. The cyclization is conveniently carried out by heating at reflux temperature for about five to about sixty minutes. A ratio of one gram of amidine salt to about five grams of organic solvent is advantageous.

The 4-alkylamino-6-amino-2-aryl-5-nitrosopyrimidine intermediates are prepared by condensing an amidine hydrohalide, preferably the hydrochloride or hydrobromide, with advantageously, a slight excess of a lower alkyl cyanoacetate, such as methyl or ethyl cyanoacetate. The reaction is conveniently carried out in a lower alcohol solvent such as methanol or ethanol and in the presence of an alkali metal alkoxide, for example sodium methoxide, sodium ethoxide or potassium ethoxide. The reactants are heated usually at the reflux temperature of the solvent for about two to six hours. Working up the reaction mixture by evaporating the solvent, adding water to the residue, cooling and isolating the precipitate by filtration gives the 6-amino-2-aryl-4-pyrimidol. Treatment of this pyrimidol with a chlorinating agent such as phosphorus pentachloride, thionyl chloride or, preferably phosphorus oxychloride advantageously in the presence of an acid-binding agent such as dimethylaniline or pyridine gives 6-amino-2-aryl-4-chloropyrimidine. Reaction of this chloropyrimidine with at least an equivalent amount of alkylamine in aqueous solution yields 4-alkylamino-6-amino-2-arylpyrimidine. Treatment of this 4-alkylamino-6-amino-2-arylpyrimidine in acid solution with at least an equivalent amount of sodium nitrite at about +5° to —5° C. gives the 4-alkylamino-6-amino-2-aryl-5-nitrosopyrimidine intermediate.

The amidine hydrohalide starting materials, having substituents in the meta or para positions, are conveniently prepared by passing dry hydrogen chloride into a lower alcohol solution, preferably methanol or ethanol, of the appropriate benzonitrile. The resulting solution is allowed to stand at room temperature while it sets to a solid cake which is then treated with an excess of dry ammonia in absolute alcohol, such as methanol or ethanol. The reaction mixture is shaken for about 10 to 20 hours then allowed to stand for about 48 hours. The mixture is worked up by filtering, evaporating to dryness, dissolving the residue in water and acidifying with concentrated hydrohalic acid, for example hydrochloric or hydrobromic acid, concentrating and filtering the amidine hydrohalide.

The o-substituted amidine hydrohalide starting materials are conveniently prepared by treatment of the o-substituted benzonitrile with, preferably, a slight excess of hydroxylamine hydrochloride in lower alcohol solution, such as ethanol or methanol, in the presence of an alkali metal alkoxide such as sodium or potassium alkoxide, for example, sodium ethoxide or potassium methoxide. The reactants are heated conveniently at the reflux temperature of the solvent for about six to ten hours and the mixture worked up to give the o-substituted benxamidoxime which is hydrogenated in lower alcohol solution, such as methanol or ethanol, using a hydrogenating catalyst such as Raney nickle at about 60° to 70° C. until the theoretical amount of hydrogen is taken up. The alcohol solution is filtered, evaporated to dryness and the residue dissolved in hot alcohol such as methanol or ethanol. Cooling the solution and treating with hydrogen halide causes precipitation of the o-substituted amidine hydrohalide.

The N-aralkyl-α-cyanoacetamide intermediates are conveniently prepared by treatment of a lower alkyl ester, preferably the methyl or ethyl ester, of α-cyanoacetic acid with at least a molar equivalent of an aralkylamine. The reaction is advantageously carried out in a lower alcohol solution, such as methanol or ethanol. Optionally, an alkali metal alkoxide such as sodium methoxide, potassium ethoxide or sodium ethoxide is present in the reaction mixture. The reactants are stirred at room temperature for about two to about six hours, then refluxed for approximately one to five hours. Working up the mixture by concentrating the solution and recrystallizing the residue from a suitable solvent such as ether or ethanol or by cooling the solution, filtering and recrystallizing gives the N-aralkyl-α-cyanoacetamide.

The following examples are not limiting but are illustraive of compounds of this invention and will serve to make fully apparent all of the compounds embraced by the general formula given above.

*Example 1*

A solution of 12.5 g. of 4,6-diamino--5-nitroso-2-phenylpyrimidine and 11.8 g. of N-benzyl-α-cyanoacetamide in 250 ml. of dimethylformamide is heated to reflux and 3.0 g. of sodium methoxide is added slowly. The solution is refluxed for two minutes, cooled ot 100° C. and diluted with 100 ml. of water. After cooling, the precipitate is filtered from the solution. The crystals are recrystallized from dimethylformamide, then refluxed with water for twenty minutes and dried to give 4,7-diamino-N-benzyl-2-phenyl-6-pteridinecarboxamide, M.P. 314–318° C.

*Example 2*

A mixture of 12.8 g. of α-cyano-N-phenethylacetamide and 12.5 g. of 4,6-diamino-5-nitroso-2-phenylpyrimidine in 200 ml. of dimethylformamide is heated to reflux. Three grams of sodium methoxide is added slowly and the resulting mixture is refluxed for five minutes, then cooled and diluted with 100 ml. of water. The solid material is filtered off and recrystallized from dimethylformamide to give 4,7-diamino-N-phenethyl-2-phenyl-6-pteridinecarboxamide.

*Example 3*

A mixture of 24.4 g. of 4(2'-aminoethyl)pyridine, 19.8 g. of methyl α-cyanoacetate and 100 ml. of ethanol is stirred at room temperature for four hours, then refluxed for two hours. Cooling, filtering and recrystallizing the precipitate from ethanol gives α-cyano-N-(4-pyridylethyl)-acetamide.

The above prepared acetamide (12.8 g.) and 12.5 g. of 4,6-diamino-5-nitroso-2-phenylpyrimidine in 200 ml. of dimethylformamide are heated to reflux and then treated with 3.0 g. of sodium methoxide. Refluxing the resulting mixture for five minutes, cooling, diluting with water, filtering and recrystallizing the precipitate gives 4,7 - diamino-2-phenyl - N - (4' - pyridylethyl) - 6 - pteridinecarboxamide.

*Example 4*

A mixture of 22.2 g. of 2-furanethylamine and 19.8 g. of methyl α-cyanoacetate in ethanol solution is refluxed for four hours. After concentrating the solution, the residue is recrystallized from ethanol to give α-cyano-N-(2-furylethyl)acetamide.

This acetamide (12.1 g.) is heated to reflux with 12.5 g. of 4,6-diamino-5-nitroso-2-phenylpyrimidine in 225 ml. of dimethylformamide. Three grams of sodium methoxide is added slowly. The resulting mixture is refluxed for five minutes, cooled, diluted with 100 ml. of water and filtered. The solid product is recrystallized from dimethylformamide to give 4,7-diamino-N-(2'-furylethyl)-2-phenyl-6-pteridinecarboxamide.

*Example 5*

Thirty grams of p-methoxyphenethylamine and 19.8 g. of methyl α-cyanoacetate in 100 ml. of ethanol are stirred at room temperature for three hours, then refluxed for two hours. Concentration of the solution and recrystallization of the residue from ethanol gives α-cyano-N-(p-methoxyphenethyl)acetamide.

A mixture of 14.8 g. of α-cyano-N-(p-methoxyphenethyl)acetamide and 12.5 g. of 4,6-diamino-5-nitroso-2-phenylpyrimidine in 250 ml. of dimethylformamide is heated to reflux and treated with 3.0 g. of sodium methoxide. Refluxing for three minutes, cooling, adding 100 ml. of water, filtering and recrystallizing the solid product from dimethylformamide-water gives 4,7-diamino-N-(p-methoxyphenethyl)-2-phenyl-6-pteridinecarboxamide.

*Example 6*

Methyl α-cyanoacetate (24.8 g.) and β-methylphenethylamine (33.8 g.) in 150 ml. of an ethanol solution of sodium ethoxide (prepared by dissolving 0.5 g. of sodium in the ethanol) are stirred at room temperature for five hours, then refluxed for one hour. Removal of the solvent in vacuo and recrystallization of the residue from ether gives α-cyano-N-(β-methylphenethyl)acetamide.

A mixture of 11.1 g. of this acetamide, 10.7 g. of 4,6-diamino-5-nitroso-2-phenylpyrimidine and 200 ml. of dimethylformamide, heated to reflux, is treated with 3.0 g. of sodium methoxide, then refluxed for five minutes. Working up as in Example 5 gives 4,7-diamino-N-(β-methylphenethyl)-2-phenyl-6-pteridinecarboxamide.

Example 7

A mixture of 35.4 g. of α-butylphenethylamine and 19.8 g. of methyl α-cyanoacetate in 100 ml. of ethanol is stirred at room temperature for three hours, then refluxed for two hours. Removing the solvent in vacuo and recrystalizing the residue from ether gives α-cyano-N-(α-butylphenethyl)acetamide.

To a mixture of 13.4 g. of the above prepared cyanoacetamide and 10.7 g. of 4,6-diamino-5-nitroso-2-phenylpyrimidine in 250 ml. of dimethylformamide heated to reflux is added 3.0 g. of sodium methoxide. The solution is refluxed for five minutes, cooled to 100° C., diluted with 100 ml. of water and filtered. The solid product is recrystallized from dimethylformamide and washed with boiling water to give 4,7-diamino-N-(α-butylphenethyl)-2-phenyl-6-pteridinecarboxamide.

Example 8

Phosphorus oxychloride (100 ml.) is added to a mixture of 20 g. of 6-amino-2-phenyl-4-pyrimidol and 10 ml. of dimethylaniline and the resulting mixture is refluxed for eight hours, then concentrated in vacuo. The residue is treated with water and with an excess of concentrated ammonium hydroxide. The mixture is heated at 90-95° C. for one hour, concentrated, cooled and filtered. The pricipitate is filtered off, washed with water and ground in a mortar with 15 ml. of 1 N sodium hydroxide. The solid product is filtered off and washed with water to give 6-amino-4-chloro-2-phenylpyrimidine.

A mixture of 12.0 g. of 6-amino-4-chloro-2-phenylpyrimidine and 30 ml. of 25% aqueous methylamine is heated in a bomb at 125° C. for four hours. The product, 6-amino-4-methylamino-2-phenylpyrimidine, is obtained by filtration.

The above product (10.0 g.) is heated to 90° C. with 200 ml. of 10% acetic acid. The solution is filtered, cooled to 0° C. and treated with 5.0 g. of sodium nitrite in aqueous solution. The mixture is allowed to stand at 0° C. for one hour, then at room temperature for one hour. Filtration to isolate the solid product gives 6-amino-4-methylamino-5-nitroso-2-phenylpyrimidine.

Sodium methoxide (3.0 g.) is added to a refluxing solution of 9.6 g. of N-benzyl-α-cyanoacetamide and 11.5 g. of 6-amino-4-methylamino-5-nitroso-2-phenylpyrimidine in 250 ml. of dimethylformamide. The resulting mixture is refluxed for five minutes and worked up as in Example 7 to give 7-amino-N-benzyl-4-methylamino-2-phenyl-6-pteridinecarboxamide.

Example 9

A mixture of 10.0 g. of 6-amino-4-chloro-2-phenylpyrimidine, prepared as in Example 8, and 35 ml. of 25% aqueous dimethylamine is heated at 125° C. in a bomb for five hours. Filtration of the mixture gives 6-amino-4-dimethylamino-2-phenylpyrimidine as the solid product.

Eight grams of the above prepared pyrimidine and 175 ml. of 10% acetic acid are heated to 90° C., filtered and cooled to 0° C. A solution of 5.0 g. of sodium nitrite in 15 ml. of water is added portionwise and the resulting mixture is allowed to stand at 0° C. for one hour, then at room temperature for one hour. The 6-amino-4-dimethylamino-5-nitroso-2-phenylpyrimidine is isolated by filtration.

Treatment of the above prepared nitropyrimidine with N-benzyl-α-cyanoacetamide and sodium methoxide in dimethylformamide solution and working up the reaction mixture as in Example 7 gives 7-amino-N-benzyl-4-dimethylamino-2-phenyl-6-pteridinecarboxamide.

Example 10

Ten grams of 6-amino-4-chloro-2-phenylpyrimidine, made as in Example 8, is refluxed with 8.0 g. of dibutylamine in aqueous solution for six hours. The product, 6-amino-4-dibutylamino-2-phenylpyrimidine, is obtained by filtration.

A mixture of 8.0 g. of 6-amino-4-dibutylamino-2-phenylpyrimidine and 150 ml. of 10% acetic acid is heated to 90° C., then filtered and cooled to 3° C. Sodium nitrite (4.0 g.) in 10 ml. of water is added slowly. The resulting mixture is allowed to stand at 0–5° C. for one hour, then at room temperature for one hour. Filtering the solution gives 6-amino-4-dibutylamino-5-nitroso-2-phenylpyrimidine.

A mixture of 16.3 g. of the above prepared nitrosopyrimidine, 9.6 g. of N-benzyl-α-cyanoacetamide and 250 ml. of dimethylformamide is heated to reflux and treated with 3.0 g. of sodium methoxide. The resulting mixture is refluxed for ten minutes, cooled to 100° C., diluted with 150 ml. of water and filtered. The solid material is recrystallized from dimethylformamide, then refluxed with water, filtered and dried to give 7-amino-N-benzyl-4-dibutylamino-2-phenyl-6-pteridinecarboxamide.

Example 11

The silver salt of isonitrosomalononitrile (5.55 g.) is added to a solution of 4.65 g. of p-anisamidine hydrochloride in 50 ml. of methanol and the resulting mixture is stirred for one hour, then filtered. The filtrate is concentrated to dryness in vacuo at 30–40° C. and the residue is boiled for fifteen minutes in 60 ml. of a solution of 5-ethyl-2-methylpyridine and 2-picoline (2:1). Addition of water and ethanol and isolation of the dark green solid by filtration gives 4,6-diamino-2-(p-methoxyphenyl)-5-nitrosopyrimidine.

This nitrosopyrimidine is treated with N-benzyl-α-cyanoacetamide and sodium methoxide in dimethylformamide solution and the resulting mixture is worked up as in Example 10 to give 4,7-diamino-N-benzyl-2-(p-methoxyphenyl)-6-pteridinecarboxamide.

Example 12

A solution of 9.55 g. of p-chlorobenzamidine hydrochloride in 150 ml. of methanol is treated with 11.1 g. of the silver salt of isonitrosomalononitrile. The resulting mixture is stirred for one hour, filtered and concentrated to dryness in vacuo at 30–40° C. The residue is refluxed for 20 minutes in 100 ml. of 5-ethyl-2-methylpyridine. The mixture is cooled and treated with ethanol. The precipitate is filtered off and washed with ethanol to give 4,6-diamino-2-(p-chlorophenyl)-5-nitrosopyrimidine.

Sodium methoxide (3.0 g.) is added to a refluxing solution of 12.5 g. of 4,6-diamino-2-(p-chlorophenyl)-5-nitrosopyrimidine and 9.6 g. of N-benzyl-α-cyanoacetamide in 200 ml. of dimethylformamide. Refluxing the resulting mixture for five minutes, cooling to 100° C., adding 100 ml. of water, filtering and recrystallizing the solid product from aqueous dimethylformamide gives 4,7-diamino-N-benzyl-2-(p-chlorophenyl)-6 - pteridinecarboxamide.

Example 13

A cooled ethanol solution of 45.0 g. of 3-thiophenecarbonitrile is treated with dry hydrogen chloride and the resulting mixture is allowed to stand for 48 hours. An 8% solution of dry ammonia in absolute ethanol, containing 10.0 g. of ammonia, is added slowly and the reaction mixture is stirred for 12 hours, then allowed to stand for 48 hours. Filtering, evaporating to dryness, dissolving the residue in water, acidifying with concentrated hydrochloric acid, concentrating the solution and filtering off the solid product gives 3-thiophenecarboxamidine hydrochloride.

The silver salt of isonitrosomalononitrile (11.1 g.) is added to a solution of 8.1 g. of 3-thiophenecarboxamidine hydrochloride in 75 ml. of methyl alcohol. The resulting mixture is stirred for 30 minutes and filtered. The filtrate is evaporated to dryness in vacuo. The residue is refluxed with 50 ml. of 5-ethyl-2-methylpyridine for 20 minutes. Cooling the mixture, diluting with 100 ml. of ethanol and filtering gives 4,6-diamino-5-nitroso-2-(3'-thienyl)-pyrimidine.

To a refluxing solution of 11.0 g. of the above prepared pyrimidine and 9.6 g. of N-benzyl-α-cyanoacetamide in 250 ml. of dimethylformamide is added 3.0 g. of sodium methoxide. Refluxing the resulting mixture for five minutes and working up as in Example 12 gives 4,7-diamino-N-benzyl-2-(3'-thienyl)-6-pteridinecarboxamide.

Example 14

To a stirred solution of 10.2 g. of 2-amino-4-chlorobenzamidine hydrochloride in 75 ml. of methanol is added 11.1 g. of the silver salt of isonitrosomalononitrile. The resulting mixture is stirred for one hour, filtered and evaporated to dryness. The residue is refluxed with 100 ml. of 2-picoline, cooled, diluted with 100 ml. of ethanol and filtered to give 4,6-diamino-2-(2'-amino-4'-chlorophenyl)-5-nitrosopyrimidine.

To a refluxing solution of 13.2 g. of the above prepared pyrimidine in 250 ml. of dimethylformamide is added 9.6 g. of N-benzyl-α-cyanoacetamide and 3.0 g. of sodium methoxide. The refluxing is continued for five minutes. Hot water (150 ml.) is added and the mixture is cooled and filtered. The crystals thus obtained are recrystallized from dimethylformamide to give 4,7-diamino-2-(2'-amino-4'-chlorophenyl)-N-benzyl - 6 - pteridine carboxamide.

Example 15

Treatment of 45.0 g. of 2-thiophenecarbonitrile in ethanol solution with dry hydrogen chloride and subsequently with an ethanol solution of ammonia and working up as in Example 13 gives 2-thiophenecarboxamidine hydrochloride.

The above prepared hydrochloride (8.0 g.) is reacted with 11.1 g. of the silver salt of isonitrosomalononitrile in methanol solution and cyclized by subsequent refluxing in 75 ml. of 5-ethyl-2-methylpyridine as in Example 13 to give 4,6-diamino-5-nitroso-2-(2'-thienyl)pyrimidine.

Eleven grams of this pyrimidine and 9.6 g. of N-benzyl-α-cyanoacetamide in 250 ml. of refluxing dimethylformamide are treated with 3.0 g. of sodium methoxide. The resulting mixture is refluxed for six minutes, then diluted with 150 ml. of water, cooled and filtered. The solid product is recrystallized from dimethylformamide to give 4,7-diamino-N-benzyl-2-(2'-thienyl) - 6 - pteridinecarboxamide.

Example 16

A mixture of 19.8 g. of methyl α-cyanoacetate, 24.2 g. of m-methylbenzylamine and 125 ml. of ethanol is stirred at room temperature for three hours, then refluxed for two hours. The mixture is cooled, filtered and the solid material is recrystallized from ethanol to give α-cyano-N-(m-methylbenzyl)acetamide.

To a refluxing solution of 10.7 g. of 4,6-diamino-5-nitroso-2-phenylpyrimidine and 11.1 g. of α-cyano-N-(m-methylbenzyl)acetamide in 250 ml. of dimethylformamide is added 3.0 g. of sodium methoxide. Refluxing the resulting mixture for five minutes and working up as in Example 15 gives 4,7-diamino-N-(m-methylbenzyl)-2-phenyl-6-pteridinecarboxamide.

Example 17

Treatment of 31.0 g. p-chlorobenzylamine with 19.8 g. of methyl α-cyanoacetate in ethanol solution and working up as in Example 16 gives N-(p-chlorobenzyl)-α-cyano acetamide.

A mixture of 11.4 g. of the above prepared acetamide, 10.7 g. of 4,6-diamino-5-nitroso-2-phenylpyrimidine in 200 ml. of refluxing dimethylformamide is treated with 3.0 g. of sodium methoxide. The resulting mixture is refluxed for five minutes, treated with 100 ml. of water, cooled and filtered. Recrystallization of the solid product from dimethylformamide yields 4,7-diamino-N-(p-chlorobenzyl)-2-phenyl-6-pteridinecarboxamide.

Example 18

An ethanol solution of 38.2 g. of p-butylphenethyl amine and 19.8 g. of methyl α-cyanoacetate is stirred at room temperature for three hours, then refluxed for 90 minutes. Cooling, filtering and recrystallizing the product from ethanol gives N - (p - butylphenethyl) - α - cyanoacetamide.

Treatment of the above prepared acetamide with 4,6-diamino - 5 - nitroso - 2-phenylpyridimidine in dimethylformamide solution as described in Example 17 gives 4,7-diamino - N - (p-butylphenethyl)-2-phenyl-6-pteridinecarboxamide.

Example 19

A mixture of 38.6 g. of p-butoxybenzylamine, 19.8 g. of methyl α-cyanoacetate and 125 ml. of ethanol is stirred at room temperature for four hours. Refluxing the mixture for three hours, cooling, filtering and recrystallizing the product from ethanol gives N-(p-butoxybenzyl)-α-cyanoacetamide.

Sodium methoxide (1.5 g.) is added to a refluxing solution of 5.3 g. of 4,6-diamino-5-nitroso-2-phenylpyrimidine and 12.6 g. of N-(p-butoxybenzyl)-α-cyanoacetamide in 150 ml. of dimethylformamide. The mixture is refluxed for five minutes, then diluted with water, cooled and filtered. The crystals thus obtained are recrystallized from dimethylformamide to give 4,7-diamino-N-(p-butoxybenzyl)-2-phenyl-6-pteridinecarboxamide.

Example 20

An ethanol solution 33.2 g. of o-nitrophenethylamine and 19.8 g. of methyl α-cyanoacetate is kept at room temperature for four hours with stirring. Refluxing the mixture for two hours and working up as in Example 19 gives α-cyano-N-(o-nitrophenethyl)acetamide.

Treatment of the above prepared acetamide with 4,6-diamino-5-nitroso-2-phenylpyrimidine and sodium methoxide in dimethylformamide solution as in Example 19 gives 4,7-diamino-N-(o-nitrophenethyl)-2-phenyl-6-pteridinecarboxamide.

Example 21

A mixture of 27.0 g. of 3-thiopheneëthylamine and 19.8 g. of methyl α-cyanoacetate in 100 ml. of ethanol is stirred for three hours, then refluxed for two hours. Concentrating the solution and recrystallizing the residue from ethanol gives α-cyano-N-(3-thienylethyl)acetamide.

To a refluxing solution of 10.7 g. of the above prepared acetamide and 10.7 g. of 4,6-diamino-5-nitroso-2-phenylpyrimidine in 200 ml. of dimethylformamide is added 3.0 g. of sodium methoxide and the resulting mixture is refluxed for five minutes. Diluting with water, cooling, filtering and recrystallizing the crystals from dimethylformamide gives 4,7 - diamino - N - (3' - thienylethyl)-2-phenyl-6-pteridinecarboxamide.

Example 22

To a solution of 8.5 g. of m-toluamidine hydrochloride in 80 ml. of methanol is added 11.1 g. of the silver salt of isonitrosomalononitrile. The mixture is stirred for one hour, filtered and concentrated to dryness in vacuo. The residue is refluxed with 100 ml. of 5-ethyl-2-methylpyridine and 50 ml. of 2-picoline. The mixture is cooled, diluted with 100 ml. of ethanol and filtered to give 4,6-diamino-5-nitroso-2-(m-tolyl)-pyrimidine.

Sodium methoxide (1.5 g.) is added to a refluxing solution of 5.7 g. of the above prepared pyrimidine and 4.8 g. of N-benzyl-α-cyanoacetamide in 200 ml. of dimethylformamide. Working up as in Example 21 gives 4,7-diamino-N-benzyl-2-(m-tolyl)-6-pteridinecarboxamide.

*Example 23*

The silver salt of isonitrosomalononitrile (11.1 g.) is added to a solution of 10.8 g. of 4-hydroxy-3-nitrobenzamidine hydrochloride in 100 ml. of methanol. The resulting mixture is stirred for 30 minutes and filtered. The filtrate is concentrated to dryness and the residue is refluxed with 100 ml. of 5-ethyl-2-methylpyridine for ten minutes. Working up as in Example 22 gives 4,6-diamino-2-(4'-hydroxy-3'-nitrophenyl)-5-nitrosopyrimidine.

N-benzyl-α-cyanoacetamide (11.8 g.) and 3.1 g. of sodium methoxide are added to a boiling solution of 16.0 g. of the above prepared pyrimidine in 250 ml. of dimethylformamide. The resulting solution is refluxed for three minutes, cooled to 100° C., diluted with 100 ml. of water and filtered. The solid product is recrystallized from dimethylformamide to give 4,7-diamino-N-benzyl-2-(4'-hydroxy-3'-nitrophenyl)-6-pteridinecarboxamide.

*Example 24*

A mixture of 17.7 g. of 6-phenylhexylamine and 9.9 g. of methyl α-cyanoacetate in 100 ml. of ethanol is stirred at room temperature for four hours, then refluxed for two hours. Evaporating the solution and recrystallizing the residue from ethanol gives α-cyano-N-(6-phenylhexyl)-acetamide.

Sodium methoxide (6.0 g.) is added to a refluxing solution of 26.8 g. of α-cyano-N-(6-phenylhexyl)acetamide and 21.5 g. of 4,6-diamino-5-nitroso-2-phenylpyrimidine in 400 ml. of dimethylformamide. The solution is heated at reflux for five minutes, cooled to 100° C., diluted with 100 ml. of water and filtered. The solid product is recrystallized from aqueous dimethylformamide to give 4,7-diamino-2-phenyl-N-(6'-phenylhexyl)-6-pteridinecarboxamide.

What is claimed is:

1. A chemical compound having the following structural formula:

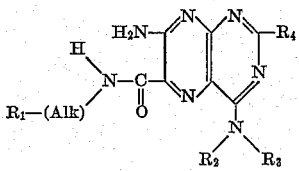

in which $R_1$ is a member selected from the group consisting of phenyl, phenyl monosubstituted by a member selected from the group consisting of lower alkyl, lower alkoxy, chloro, bromo and nitro, furyl, thienyl and pyridyl; Alk is an alkylene group of from 1 to 6 carbon atoms; $R_2$ and $R_3$ are members selected from the group consisting of hydrogen and lower alkyl; $R_4$ is a member selected from the group consisting of phenyl,

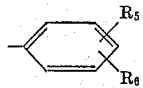

and thienyl; and $R_5$ and $R_6$ are members selected from the group consisting of lower alkyl, lower alkoxy, chloro, bromo, nitro, hydroxy and amino.

2. A chemical compound having the following structural formula:

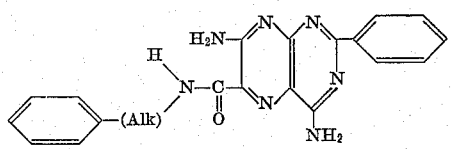

in which Alk is an alkylene group of from 1 to 6 carbon atoms.

3. A chemical compound having the following structural formula:

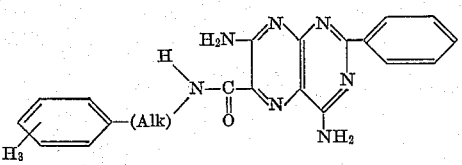

in which Alk is an alkylene group of from 1 to 6 carbon atoms.

4. A chemical compound having the following structural formula:

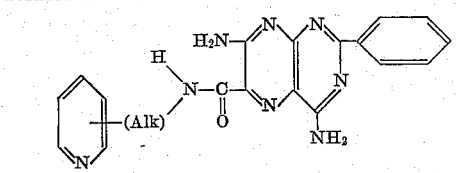

in which Alk is an alkylene group of from 1 to 6 carbon atoms.

5. 4,7 - diamino - N - benzyl - 2 - phenyl - 6 - pteridinecarboxamide.

6. 4,7 - diamino - N - phenethyl - 2 - phenyl - 6 - pteridinecarboxamide.

7. 4,7 - diamino - N - (m - methylbenzyl) - 2 - phenyl-6-pteridinecarboxamide.

8. 4,7 - diamino - 2 - phenyl - N - (4' - pyridylethyl)-6-pteridinecarboxamide.

No references cited.